(12) United States Patent
Sun et al.

(10) Patent No.: US 9,912,390 B2
(45) Date of Patent: Mar. 6, 2018

(54) METHOD FOR GUARANTEEING CHANNEL PHASE CONTINUITY OF PRE-CODED RB GROUPS, BASE STATION AND COMPUTER-READABLE STORAGE MEDIUM

(71) Applicant: ZTE Corporation, Shenzhen, Guangdong (CN)

(72) Inventors: Baoyu Sun, Shenzhen (CN); Yajun Zhao, Shenzhen (CN); Yujie Li, Shenzhen (CN); Xin Zhang, Shenzhen (CN); Linmei Mo, Shenzhen (CN); Hanqing Xu, Shenzhen (CN); Guofeng Chen, Shenzhen (CN); Chen Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 120 days.

(21) Appl. No.: 14/776,617

(22) PCT Filed: Dec. 25, 2013

(86) PCT No.: PCT/CN2013/090476
§ 371 (c)(1),
(2) Date: Sep. 14, 2015

(87) PCT Pub. No.: WO2014/166285
PCT Pub. Date: Oct. 16, 2014

(65) Prior Publication Data
US 2016/0028456 A1    Jan. 28, 2016

(30) Foreign Application Priority Data
Apr. 10, 2013  (CN) .......................... 2013 1 0123230

(51) Int. Cl.
*H04W 4/00* (2009.01)
*H04B 7/0456* (2017.01)
(Continued)

(52) U.S. Cl.
CPC ........... *H04B 7/0456* (2013.01); *H04B 7/043* (2013.01); *H04B 7/0421* (2013.01);
(Continued)

(58) Field of Classification Search
None
See application file for complete search history.

(56) References Cited

U.S. PATENT DOCUMENTS

| 9,030,952 B2* | 5/2015 | Ko ....................... H04B 7/0413 370/241 |
| 2006/0199604 A1* | 9/2006 | Walton .................. H04W 52/42 455/522 |

(Continued)

FOREIGN PATENT DOCUMENTS

| CN | 101442388 A | 5/2009 |
| CN | 102065557 A | 5/2011 |
| CN | 102790637 A | 11/2012 |

OTHER PUBLICATIONS

Supplementary European Search Report in European application No. 13881811.7, dated Nov. 19, 2015.
(Continued)

*Primary Examiner* — Kibrom T Hailu
(74) *Attorney, Agent, or Firm* — Oppedahl Patent Law Firm LLC

(57) ABSTRACT

A method for guaranteeing channel phase continuity of pre-coded RB groups, a base station and a computer-readable storage medium are described. The method includes that: a base station implements a channel estimation through a Sounding Reference Signal (SRS) measurement to obtain
(Continued)

an uplink channel and obtains a corresponding downlink channel based on reciprocity of uplink and downlink channels; the base station calculates a weight phase correction factor based on the obtained downlink channel and corrects a pre-coding weight with the weight phase correction factor; and the base station pre-codes data according to the corrected pre-coding weight and sends the pre-coded data.

8 Claims, 2 Drawing Sheets

(51) Int. Cl.
    *H04B 7/04*     (2017.01)
    *H04B 7/0452*     (2017.01)
    *H04B 7/06*     (2006.01)
    *H04L 25/02*     (2006.01)
    *H04B 17/24*     (2015.01)
    *H04B 17/309*     (2015.01)

(52) U.S. Cl.
    CPC ........... *H04B 7/0452* (2013.01); *H04B 7/063* (2013.01); *H04B 7/0634* (2013.01); *H04B 7/0682* (2013.01); *H04B 17/24* (2015.01); *H04B 17/309* (2015.01); *H04L 25/0222* (2013.01)

(56) References Cited

U.S. PATENT DOCUMENTS

| | | |
|---|---|---|
| 2008/0192846 A1 | 8/2008 | Bjerke |
| 2012/0062421 A1 | 3/2012 | Su |
| 2012/0140851 A1* | 6/2012 | Zhang ................. H04B 7/0456 375/296 |
| 2012/0147984 A1* | 6/2012 | Bjerke ................ H04L 25/0212 375/285 |
| 2014/0064109 A1* | 3/2014 | Krishnamurthy .... H04J 11/0053 370/252 |

OTHER PUBLICATIONS

Aspects of Joint Processing in Downlink CoMP, mailed on Jan. 8, 2009.

International Search Report in international application No. PCT/CN2013/090476 , dated Mar. 27, 2014.

English Translation of the Written Opinion of the International Search Authority in international application No. PCT/CN2013/090476 , dated Mar. 27, 2014.

* cited by examiner

METHOD FOR GUARANTEEING CHANNEL PHASE CONTINUITY OF PRE-CODED RB GROUPS, BASE STATION AND COMPUTER-READABLE STORAGE MEDIUM

TECHNICAL FIELD

The disclosure relates to a pre-coding technology in the field of wireless communications, and in particular to a method for guaranteeing channel phase continuity of pre-coded RB groups, a base station and a computer-readable storage medium.

BACKGROUND

Beamforming (BF) is a key Multiple Input Multiple Output (MIMO) technology supported by the Time Division Dulpexing Long Term Evolution (TDD-LTE) system. The frequency domain Resource Blocks (RBs) of a channel phase are continuous originally, however, in view of the complexity and the realizability of actual systems and devices, different RB groups adopt different BF weight vectors which take RB group as granularity, thus breaking the continuity of channel phases of RB groups and generating a split. Due to the existence of discontinuous phases, the following operation is not suitable for the channel estimation of downlink Demodulation Reference Signal (DMRS)/pilot frequency: the time domain/frequency domain de-noising processing subsequent to a Least Square (LS) channel estimation based on continuous RBs (RB group), the implementation of which will increase a channel estimation error and influence the performance of a BF system.

SUMMARY

To address existing technical problems, the disclosure provides a method for guaranteeing channel phase continuity of pre-coded RB groups, a base station and a computer-readable storage medium.

The disclosure provides a method for guaranteeing channel phase continuity of pre-coded RB groups, which includes:

a base station implements a channel estimation through a Sounding Reference Signal (SRS) measurement to obtain an uplink channel and obtains a corresponding downlink channel based on reciprocity of uplink and downlink channels;

the base station calculates a weight phase correction factor based on the obtained downlink channel and corrects a pre-coding weight with the weight phase correction factor; and the base station pre-codes data according to the corrected pre-coding weight and sends the pre-coded data.

The process that the base station calculates a weight phase correction factor based on the obtained downlink channel may include:

the base station calculates, for the obtained downlink channel, a channel mean by using RBs or RB Groups (RBGs);

the base station carries out a singular value decomposition operation for the channel mean of a scheduled RB according to a following formula: $\overline{H}_n = U_n D_n V_n^H$, where $\overline{H}_n$ represents a channel mean, $U_n$ and $V_n$ represent unitary matrixes, $V_n^H$ represents a transposed matrix of $V_n$, and $D_n$ represents a diagonal matrix composed of singular values of $\overline{H}_n$; and based on a result of the singular value decomposition, the base station calculates a weight phase correction factor according to a following formula:

$$Q_n = \frac{V_n(1,1)}{|V_n(1,1)|}$$

or $Q_n = e^{-j*angle(U_n(1,1))}$, where $angle(U_n)$ represents phase of $U_n$, and $Q_n$ represents a weight phase correction factor.

The process that the base station calculates a weight phase correction factor based on the obtained downlink channel may include:

the base station calculates, for the obtained downlink channel, a channel mean by using RBs or RBGs;

the base station carries out an eigenvalue decomposition operation for the channel mean of a scheduled RB according to a following formula: $\overline{H}_n \overline{H}_n^H = U_n \Sigma_n U_n^H$, where $\overline{H}_n$ represents a channel mean, $U_n$ represents a unitary matrix, $U_n^H$ represents a transposed matrix of $U_n$, and $\Sigma_n$ represents a diagonal matrix composed of characteristic values of $\overline{H}_n$; and based on a result of the eigenvalue decomposition, the base station calculates a weight phase correction factor according to a following formula: $Q_n = e^{-j*angle(U_n(1,1))}$, where $angle(U_n)$ represents phase of $U_n$, and $Q_n$ represents a weight phase correction factor.

The base station may calculate, for the obtained downlink channel, a channel mean by using RBs according to a following formula:

$$\overline{H}_n = \frac{1}{6} \sum_{k=k_0+1}^{k_0+6} H_k,$$

where n represents a sequence number of an RB, $k_0$ represents a sequence number of a starting subcarrier of the RB, k represents a sequence number of a subcarrier of the RB, $H_k$ represents a downlink channel, and $\overline{H}_n$ represents a channel mean.

The base station may calculate, for the obtained downlink channel, a channel mean by using RBGs according to a following formula:

$$\overline{H}_n = \frac{1}{6*N} \sum_{k=k_0+1}^{k_0+6*N} H_k,$$

where n represents a sequence number of an RBG, $k_0$ represents a sequence number of a starting subcarrier of the RBG, k represents a sequence number of a subcarrier of the RBG, N represents a number of the RBs in the RBG, $H_k$ represents a downlink channel, and $\overline{H}_n$ represents a channel mean.

The pre-coding weight may be corrected with the weight phase correction factor according to a following formula:

$$W_n = (U_n Q_n)^H,$$

where $W_n$ represents a corrected pre-coding weight, $U_n$ represents a unitary matrix, $Q_n$ represents the weight phase correction factor, and $(U_n Q_n)^H$ represents a transposed matrix of $U_n Q_n$.

The disclosure also provides a base station, which includes:

a channel estimator configured to implement a channel estimation through a Sounding Reference Signal (SRS) measurement to obtain an uplink channel and obtain a corresponding downlink channel based on reciprocity of uplink and downlink channels;

a correction factor calculator configured to calculate a weight phase correction factor based on the obtained downlink channel and correct a pre-coding weight with the weight phase correction factor; and a pre-coder configured to pre-code data according to the corrected pre-coding weight and send the pre-coded data.

The correction factor calculator may also be configured to:

calculate, for the obtained downlink channel, a channel mean by using RBs or RB Groups (RBGs);

carry out a singular value decomposition operation for the channel mean of a scheduled RB according to a following formula: $\overline{H}_n = U_n D_n V_n^H$, where $\overline{H}_n$ represents a channel mean, $U_n$ and $V_n$ represent unitary matrixes, $V_n^H$ represents a transposed matrix of $V_n$, and $D_n$ represents a diagonal matrix composed of singular values of $\overline{H}_n$; and calculate, based on a result of the singular value decomposition, a weight phase correction factor according to a following formula:

$$Q_n = \frac{V_n(1,1)}{|V_n(1,1)|}$$

or $Q_n = e^{-j*angle(U_n(1,1))}$, where angle($U_n$) represents phase of $U_n$, and $Q_n$ represents a weight phase correction factor.

The correction factor calculator may also be configured to:

calculate, for the obtained downlink channel, a channel mean by using RBs or RBGs;

carry out an eigenvalue decomposition operation for the channel mean of a scheduled RB according to a following formula: $\overline{H}_n \overline{H}_n^H = U_n \Sigma_n U_n^H$, where $\overline{H}_n$ represents a channel mean, $U_n$ represents a unitary matrix, $U_n^H$ represents a transposed matrix of $U_n$, and $\Sigma_n$ represents a diagonal matrix composed of characteristic values of $\overline{H}_n$; and calculate, based on a result of the eigenvalue decomposition, a weight phase correction factor according to a following formula: $Q_n = e^{-j*angle(U_n(1,1))}$, where angle($U_n$) represents phase of $U_n$, and $Q_n$ represents a weight phase correction factor.

The correction factor calculator may calculate, for the obtained downlink channel, a channel mean by using RBs according to a following formula:

$$\overline{H}_n = \frac{1}{6} \sum_{k=k_0+1}^{k_0+6} H_k,$$

where n represents a sequence number of an RB, $k_0$ represents a sequence number of a starting subcarrier of the RB, k represents a sequence number of a subcarrier of the RB, $H_k$ represents a downlink channel, and $\overline{H}_n$ represents a channel mean.

The correction factor calculator may calculate, for the obtained downlink channel, a channel mean by using RBGs according to a following formula:

$$\overline{H}_n = \frac{1}{6*N} \sum_{k=k_0+1}^{k_0+6*N} H_k,$$

where n represents a sequence number of an RBG, $k_0$ represents a sequence number of a starting subcarrier of the RBG, k represents a sequence number of a subcarrier of the RBG, N represents a number of the RBs in the RBG, $H_k$ represents a downlink channel, and $\overline{H}_n$ represents a channel mean.

The correction factor calculator may also be configured to correct a pre-coding weight with the weight phase correction factor according to a following formula:

$$W_n = (U_n Q_n)^H,$$

where $W_n$ represents a corrected pre-coding weight, $U_n$ represents a unitary matrix, $Q_n$ represents the weight phase correction factor, and $(U_n Q_n)^H$ represents a transposed matrix of $U_n Q_n$.

The disclosure further provides a computer-readable storage medium which includes a group of instructions for executing the foregoing method for guaranteeing channel phase continuity of pre-coded RB groups.

According to the method for guaranteeing the channel phase continuity of pre-coded RB groups, the base station and the computer-readable storage medium provided herein, the base station calculates a weight phase correction factor for guaranteeing the channel phase continuity of pre-coded RB groups, corrects a pre-coding weight with the weight phase correction factor, pre-codes data according to the corrected pre-coding weight and sends the pre-coded data. The disclosure guarantees the channel phase continuity of pre-coded RB groups and improves the performance and the spectrum effectiveness of a system.

DETAILED DESCRIPTION

The technical solutions of the disclosure are described below in detail with reference to the drawings in conjunction with specific embodiments.

Figure 1:
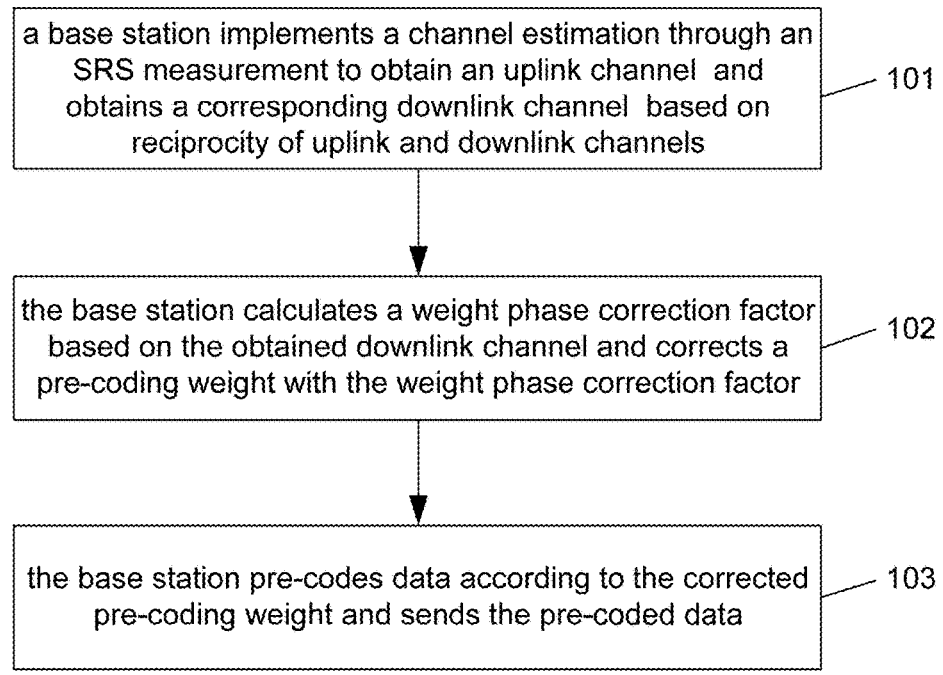
FIG. 1 is a flowchart illustrating a method for guaranteeing channel phase continuity of pre-coded RB groups according to an embodiment of the disclosure.

The disclosure provides a method for guaranteeing channel phase continuity of pre-coded RB groups, as shown in FIG. 1, which mainly includes:

Step 101: a base station implements a channel estimation through an SRS measurement to obtain an uplink channel $H_{UL}$ and obtains a corresponding downlink channel $H_{DL}$ based on reciprocity of uplink and downlink channels;

For the sake of convenience of description, $H_{DL}$ is hereinafter referred to as H, wherein H has $T_X * R_X$ dimensions, in which $T_X$ represents the number of antennas configured at an emitting terminal, and $R_X$ represents the number of antennas configured at a receiving terminal; and Step 102: the base station calculates a weight phase correction factor based on the obtained downlink channel and corrects a pre-coding weight with the weight phase correction factor.

Figure 2:
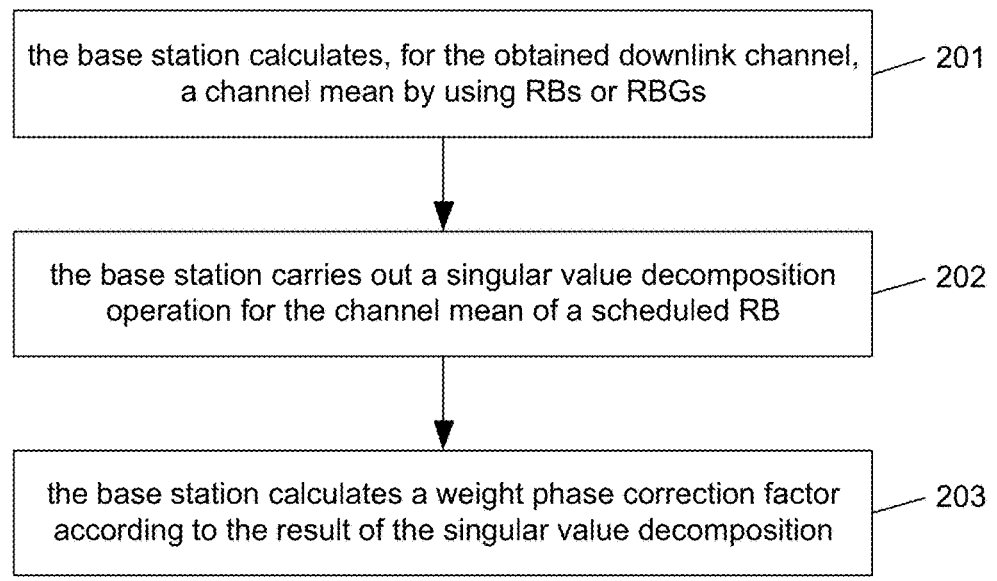
FIG. 2 is a flowchart illustrating a method for calculating a weight phase correction factor according to an embodiment of the disclosure.

As shown in FIG. 2, according to an embodiment of the disclosure, a method used in the base station to calculate the weight phase correction factor based on the obtained downlink channel mainly includes:

Step 201, the base station calculates, for the obtained downlink channel, a channel mean by using RBs or RBGs;

in an implementation mode, the channel mean may be calculated by RBs according to the following formula:

$$\overline{H}_n = \frac{1}{6} \sum_{k=k_0+1}^{k_0+6} H_k,$$

where n represents the sequence number of an RB, $k_0$ represents the sequence number of the starting subcarrier of the RB, k represents the sequence number of a subcarrier of the RB, $H_k$ represents a downlink channel, and $\overline{H}_n$ represents a channel mean.

the channel mean may be calculated by using RBGs according to the following formula:

$$\overline{H}_n = \frac{1}{6*N} \sum_{k=k_0+1}^{k_0+6*N} H_k,$$

where n represents the sequence number of an RBG, $k_0$ represents the sequence number of the starting subcarrier of the RBG, k represents the sequence number of a subcarrier of the RBG, N represents the size of the RBG, that is, the number of the RBs in the RBG, $H_k$ represents a downlink channel, and $\overline{H}_n$ represents a channel mean;

Step 202: the base station carries out a singular value decomposition operation for the channel mean of a scheduled RB;

in an implementation mode, the base station may carry out a singular value decomposition operation for the channel mean of a scheduled RB according to the following formula:

$$\overline{H}_n = U_n D_n V_n^H,$$

where $\overline{H}_n$ represents a channel mean, $U_n$ and $V_n$ represent unitary matrixes, $V_n^H$ represents a transposed matrix of $V_n$, and $D_n$ represents a diagonal matrix composed of singular values of $\overline{H}_n$; and Step 203: the base station calculates a weight phase correction factor according to the result of the singular value decomposition.

in an implementation mode, the base station may calculate a weight phase correction factor according to the following formula:

$$Q_n = \frac{V_n(1,1)}{|V_n(1,1)|} \text{ or } Q_n = e^{-j*angle(U_n(1,1))},$$

where angle($U_n$) represents the phase of $U_n$, $Q_n$ represents a weight phase correction factor, $V_n(1,1)$ represents the element in the first column and the first row of $V_n$, and $|V_n(1,1)|$ represents the absolute value of $V_n(1,1)$.

Figure 3:
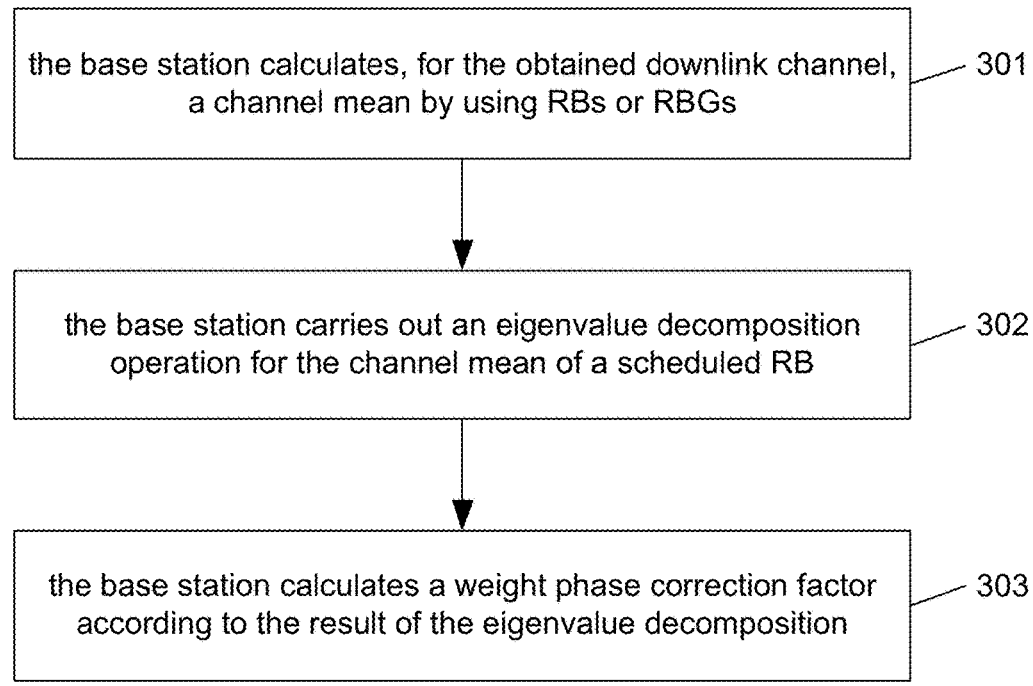
FIG. 3 is a flowchart illustrating another method for calculating a weight phase correction factor according to an embodiment of the disclosure.

As shown in FIG. 3, according to an embodiment of the disclosure, another method used in the base station to calculate the weight phase correction factor based on the obtained downlink channel mainly includes:

Step 301: the base station calculates, for the obtained downlink channel, a channel mean by using RBs or RBGs;

the method for calculating the channel mean is identical to that used in the embodiment shown in FIG. 2 and is therefore not described here repeatedly;

Step 302: the base station carries out an eigenvalue decomposition operation for the channel mean of a scheduled RB;

in an implementation mode, the base station may carry out an eigenvalue decomposition operation for the channel mean of a scheduled RB according to the following formula:

$$\overline{H}_n \overline{H}_n^H = U_n \Sigma_n U_n^H,$$

where $\overline{H}_n$ represents a channel mean, $U_n$ represents a unitary matrix, $U_n^H$ represents a transposed matrix of $U_n$, and $\Sigma_n$ represents a diagonal matrix composed of characteristic values of $\overline{H}_n$; and Step 303: the base station calculates a weight phase correction factor according to the result of the eigenvalue decomposition.

In an implementation mode, the base station may calculate a weight phase correction factor according to the following formula:

$$Q_n = e^{-j*angle(U_n(1,1))},$$

where angle($U_n$) represents the phase of $U_n$, and $Q_n$ represents a weight phase correction factor.

In an implementation mode, the base station may correct a pre-coding weight with the weight phase correction factor obtained using the method shown in FIG. 2 or FIG. 3 according to the following formula:

$$W_n = (U_n Q_n)^H,$$

where $W_n$ represents the corrected pre-coding weight, $U_n$ represents a unitary matrix, $Q_n$ represents the weight phase correction factor, and $(U_n Q_n)^H$ represents a transposed matrix of $U_n Q_n$; and Step 103: the base station pre-codes data according to the corrected pre-coding weight and sends the pre-coded data.

Figure 4:
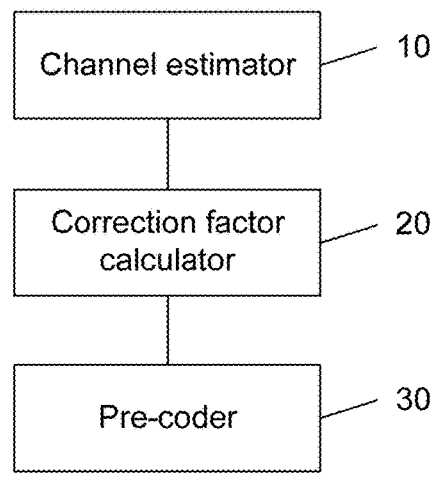
FIG. 4 is a structural diagram of a base station according to an embodiment of the disclosure.

Corresponding to the method for guaranteeing the channel phase continuity of pre-coded RB groups, the disclosure also provides a base station which, as shown in FIG. 4, mainly includes:

a channel estimator 10 configured to implement a channel estimation through an SRS measurement to obtain an uplink channel and obtain a corresponding downlink channel based on reciprocity of uplink and downlink channels;

a correction factor calculator 20 configured to calculate a weight phase correction factor based on the obtained downlink channel and correct a pre-coding weight with the weight phase correction factor; and a pre-coder 30 configured to pre-code data according to the corrected pre-coding weight and send the pre-coded data.

In an implementation mode, the correction factor calculator 20 is also configured to:

calculate, for the obtained downlink channel, a channel mean by using RBs or RBGs;

carry out a singular value decomposition operation for the channel mean of a scheduled RB according to the following formula: $\overline{H}_n = U_n D_n V_n^H$, where $\overline{H}_n$ represents a channel mean, $U_n$ and $V_n$ represent unitary matrixes, $V_n^H$ represents a transposed matrix of $V_n$, and $D_n$ represents a diagonal matrix composed of singular values of $\overline{H}_n$; and calculate, based on the result of the singular value decomposition, a weight phase correction factor according to the following formula:

$$Q_n = \frac{V_n(1,1)}{|V_n(1,1)|}$$

or $Q_n = e^{-j*angle(U_n(1,1))}$, where angle($U_n$) represents the phase of $U_n$, and $Q_n$ represents a weight phase correction factor.

In an implementation mode, the correction factor calculator 20 is also configured to:

calculate, for the obtained downlink channel, a channel mean by using RBs or RBGs;

carry out an eigenvalue decomposition operation for the channel mean of a scheduled RB according to the following formula: $\overline{H}_n\overline{H}_n^H = U_n\Sigma_n U_n^H$, where $\overline{H}_n$ represents a channel mean, $U_n$ represents a unitary matrix, $U_n^H$ represents a transposed matrix of $U_n$, and $\Sigma_n$ represents a diagonal matrix composed of characteristic values of $\overline{H}_n$; and calculate, based on the result of the eigenvalue decomposition, a weight phase correction factor according to the following formula: $Q_n = e^{-j*angle(U_n(1,1))}$, where angle($U_n$) represents the phase of $U_n$, and $Q_n$ represents a weight phase correction factor.

In an implementation mode, the correction factor calculator 20 calculates, for the obtained downlink channel, a channel mean by RBs according to the following formula:

$$\overline{H}_n = \frac{1}{6}\sum_{k=k_0+1}^{k_0+6} H_k,$$

where n represents the sequence number of an RB, $k_0$ represents the sequence number of the starting subcarrier of the RB, k represents the sequence number of a subcarrier of the RB, $H_k$ represents a downlink channel, and $\overline{H}_n$ represents a channel mean.

In an implementation mode, the correction factor calculator 20 calculates, for the obtained downlink channel, a channel mean by RBGs according to the following formula:

$$\overline{H}_n = \frac{1}{6*N}\sum_{k=k_0+1}^{k_0+6*N} H_k,$$

where n represents the sequence number of an RBG, $k_0$ represents the sequence number of the starting subcarrier of the RBG, k represents the sequence number of a subcarrier of the RBG, N represents the size of the RBG, that is, the number of the RBs in the RBG, $H_k$ represents a downlink channel, and $\overline{H}_n$ represents a channel mean.

In an implementation mode, the correction factor calculator 20 is also configured to correct a pre-coding weight with the weight phase correction factor according to the following formula:

$$W_n = (U_n Q_n)^H,$$

where $W_n$ represents the corrected pre-coding weight, $U_n$ represents a unitary matrix, $Q_n$ represents the weight phase correction factor, and $(U_n Q_n)^H$ represents a transposed matrix of $U_n Q_n$.

In conclusion, according to the disclosure, a base station calculates a weight phase correction factor for guaranteeing the channel phase continuity of pre-coded RB groups, corrects a pre-coding weight with the weight phase correction factor, pre-codes data according to the corrected pre-coding weight and sends the pre-coded data, thus guaranteeing the channel phase continuity of pre-coded RB groups and improving the performance and the spectrum effectiveness of a system.

It should be appreciated by those skilled in the art that the embodiments of the disclosure can be provided as a method, a system or a computer program product. Thus, the disclosure can be embodied as hardware, software or the combinations of hardware and software. Moreover, the disclosure may be embodied as a computer program product realized on one or more computer-usable storage mediums (including, but not limited to: disk memory and optical memory) in which computer-readable program codes are stored.

The disclosure is described with reference to the flowcharts and/or the block diagrams of the method, the device (system) and the computer program product disclosed herein. It should be appreciated that each flow and/or block or the combinations of the flows and/or the blocks shown in the flowcharts and/or block diagrams can be realized by the computer program instructions. These computer program instructions can be provided to the processor of a general computer, a dedicated computer, an embedded processor or another programmable data processor to generate a machine so as to generate a device for realizing a function designated by one or more flows and/or blocks shown in the flowcharts and/or block diagrams through the execution of the instructions by the processor of the computer or programmable data processor.

These computer program instructions may also be stored in a computer-readable memory which is capable of guiding a computer or programmable data processor to work in a given way, thereby generating, using the instructions stored in the computer readable memory, a product including an instruction device for realizing a function designated by one or more flows and/or blocks shown in the flowcharts and/or block diagrams.

These computer program instructions may also be loaded onto a computer or another programmable data processor so that a series of operations is carried out on the computer or another programmable data processor to generate a computer-realizable processing, thereby realizing, through the execution of the instructions on the computer or another programmable device, function designated by one or more flows and/or blocks shown in the flowcharts and/or block diagrams.

The disclosure further provides a computer-readable storage medium which includes a group of instructions for executing the foregoing method for guaranteeing the channel phase continuity of pre-coded RB groups.

The mentioned above are merely embodiments of the disclosure but are not to be construed as limiting the scope of the disclosure.

What is claimed is:

1. A method for guaranteeing channel phase continuity of pre-coded Resource Block (RB) groups, comprising: implementing, by a base station, a channel estimation through a Sounding Reference Signal (SRS) measurement to obtain an uplink channel, and obtaining, by the base station, a corresponding downlink channel based on reciprocity of uplink and downlink channels;

calculating, by the base station, a weight phase correction factor based on the obtained downlink channel, and correcting, by the base station, a pre-coding weight with the weight phase correction factor; and pre-coding, by the base station, data according to the corrected pre-coding weight, and sending, by the base station, the pre-coded data;

wherein the calculating, by the base station, a weight phase correction factor based on the obtained downlink channel comprises:

calculating, by the base station, a channel mean by using RBs or RB Groups (RBGs) for the obtained downlink channel;

carrying out, by the base station, a singular value decomposition operation for the channel mean of a scheduled RB according to a following formula: $\overline{H}_n = U_n D_n V_n^H$, where n represents a sequence number of an RB or an RBG, $\overline{H}_n$ represents a channel mean, $U_n$ and $V_n$ represent unitary matrixes, $V_n^H$ represents a transposed matrix of $V_n$, and $D_n$ represents a diagonal matrix composed of singular values of $\overline{H}_n$; and calculating, by the base station, a weight phase correction factor based on a result of the singular value decomposition according to a following formula:

$$Q_n = \frac{V_n(1,1)}{|V_n(1,1)|}$$

or $Q_n = e^{-j*angle(U_n(1,1))}$, where angle($U_n$) represents phase of $U_n$, and $Q_n$ represents a weight phase correction factor;

wherein the base station calculates, for the obtained downlink channel, a channel mean by using RBs according to a following formula:

$$\overline{H}_n = \frac{1}{6} \sum_{k=k_0+1}^{k_0+6} H_k,$$

where n represents a sequence number of an RB, $k_0$ represents a sequence number of a starting subcarrier of the RB, k represents a sequence number of a subcarrier of the RB, $H_k$ represents a downlink channel, and $\overline{H}_n$ represents a channel mean; or wherein the base station calculates, for the obtained downlink channel, a channel mean by using RBGs according to a following formula:

$$\overline{H}_n = \frac{1}{6*N} \sum_{k=k_0+1}^{k_0+6*N} H_k,$$

where n represents a sequence number of an RBG, $k_0$ represents a sequence number of a starting subcarrier of the RBG, k represents a sequence number of a subcarrier of the RBG, N represents a number of the RBs in the RBG, $H_k$ represents a downlink channel, and $\overline{H}_n$ represents a channel mean.

2. The method for guaranteeing channel phase continuity of pre-coded RB groups according to claim 1, wherein the pre-coding weight is corrected with the weight phase correction factor according to a following formula:

$W_n = (U_n Q_n)^H$, where $W_n$ represents a corrected pre-coding weight, $U_n$ represents a unitary matrix, $Q_n$ represents the weight phase correction factor, and $(U_n Q_n)^H$ represents a transposed matrix of $U_n Q_n$.

3. A method for guaranteeing channel phase continuity of pre-coded Resource Block (RB) groups, comprising: implementing, by a base station, a channel estimation through a Sounding Reference Signal (SRS) measurement to obtain an uplink channel, and obtaining, by the base station, a corresponding downlink channel based on reciprocity of uplink and downlink channels;

calculating, by the base station, a weight phase correction factor based on the obtained downlink channel, and correcting, by the base station, a pre-coding weight with the weight phase correction factor; and pre-coding, by the base station, data according to the corrected pre-coding weight, and sending, by the base station, the pre-coded data;

wherein the calculating, by the base station, a weight phase correction factor based on the obtained downlink channel comprises:

calculating, by the base station, a channel mean by using RBs or RBGs for the obtained downlink channel;

carrying out, by the base station, an eigenvalue decomposition operation for the channel mean of a scheduled RB according to a following formula: $\overline{H}_n \overline{H}_n^H = U_n \Sigma_n U_n^H$, where n represents a sequence number of an RB or an RBG, $\overline{H}_n$ represents a channel mean, $U_n$ represents a unitary matrix, $U_n^H$ represents a transposed matrix of $U_n$, and $\Sigma_n$ represents a diagonal matrix composed of characteristic values of $\overline{H}_n$; and calculating, by the base station, a weight phase correction factor based on a result of the eigenvalue decomposition according to a following formula: $Q_n = e^{-j*angle(U_n(1,1))}$, where angle($U_n$) represents phase of $U_n$, and $Q_n$ represents a weight phase correction factor;

wherein the base station calculates, for the obtained downlink channel, a channel mean by using RBs according to a following formula:

$$\overline{H}_n = \frac{1}{6} \sum_{k=k_0+1}^{k_0+6} H_k,$$

where n represents a sequence number of an RB, $k_0$ represents a sequence number of a starting subcarrier of the RB, k represents a sequence number of a subcarrier of the RB, $H_k$ represents a downlink channel, and $\overline{H}_n$ represents a channel mean; or wherein the base station calculates, for the obtained downlink channel, a channel mean by using RBGs according to a following formula:

$$\overline{H}_n = \frac{1}{6*N} \sum_{k=k_0+1}^{k_0+6*N} H_k,$$

where n represents a sequence number of an RBG, $k_0$ represents a sequence number of a starting subcarrier of the RBG, k represents a sequence number of a subcarrier of the RBG, N represents a number of the RBs in the RBG, $H_k$ represents a downlink channel, and $\overline{H}_n$ represents a channel mean.

4. The method for guaranteeing channel phase continuity of pre-coded RB groups according to claim 3, wherein the pre-coding weight is corrected with the weight phase correction factor according to a following formula:

$W_n = (U_n Q_n)^H$, where $W_n$ represents a corrected pre-coding weight, $U_n$ represents a unitary matrix, $Q_n$ represents the weight phase correction factor, and $(U_n Q_n)^H$ represents a transposed matrix of $U_n Q_n$.

5. A base station, comprising:
a channel estimator configured to implement a channel estimation through a Sounding Reference Signal (SRS) measurement to obtain an uplink channel and obtain a corresponding downlink channel based on reciprocity of uplink and downlink channels;
a correction factor calculator configured to calculate a weight phase correction factor based on the obtained downlink channel and correct a pre-coding weight with the weight phase correction factor; and
a pre-coder configured to pre-code data according to the corrected pre-coding weight and send the pre-coded data;
wherein the correction factor calculator is also configured to:
calculate, for the obtained downlink channel, a channel mean by using Resource Blocks (RBs) or RB Groups (RBGs);
carry out a singular value decomposition operation for the channel mean of a scheduled RB according to a following formula: $\overline{H_n} = U_n D_n V_n^H$, where n represents a sequence number of an RB or an RBG, $\overline{H_n}$ represents a channel mean, $U_n$ and $V_n$ represent unitary matrixes, $V_n^H$ represents a transposed matrix of $V_n$, and $D_n$ represents a diagonal matrix composed of singular values of $\overline{H_n}$; and
calculate, based on a result of the singular value decomposition, a weight phase correction factor according to a following formula:

$$Q_n = \frac{V_n(1,1)}{|V_n(1,1)|}$$

or $Q_n = e^{-j * angle(U_n(1,1))}$, where angle($U_n$) represents phase of $U_n$, and $Q_n$ represents a weight phase correction factor;
wherein the correction factor calculator calculates, for the obtained downlink channel, a channel mean by using RBs according to a following formula:

$$\overline{H_n} = \frac{1}{6} \sum_{k=k_0+1}^{k_0+6} H_k,$$

where n represents a sequence number of an RB, $k_0$ represents a sequence number of a starting subcarrier of the RB, k represents a sequence number of a subcarrier of the RB, $H_k$ represents a downlink channel, and $\overline{H_n}$ represents a channel mean; or
wherein the correction factor calculator calculates, for the obtained downlink channel, a channel mean by using RBGs according to a following formula:

$$\overline{H_n} = \frac{1}{6*N} \sum_{k=k_0+1}^{k_0+6*N} H_k,$$

where n represents a sequence number of an RBG, $k_0$ represents a sequence number of a starting subcarrier of the RBG, k represents a sequence number of a subcarrier of the RBG, N represents a number of the RBs in the RBG, $H_k$ represents a downlink channel, and $\overline{H_n}$ represents a channel mean.

6. The base station according to claim 5, wherein the correction factor calculator is also configured to correct the pre-coding weight with the weight phase correction factor according to a following formula:

$W_n = (U_n Q_n)^H$, where $W_n$ represents a corrected pre-coding weight, $U_n$ represents a unitary matrix, $Q_n$ represents the weight phase correction factor, and $(U_n Q_n)^H$ represents a transposed matrix of $U_n Q_n$.

7. A base station, comprising:
a channel estimator configured to implement a channel estimation through a Sounding Reference Signal (SRS) measurement to obtain an uplink channel and obtain a corresponding downlink channel based on reciprocity of uplink and downlink channels;
a correction factor calculator configured to calculate a weight phase correction factor based on the obtained downlink channel and correct a pre-coding weight with the weight phase correction factor; and
a pre-coder configured to pre-code data according to the corrected pre-coding weight and send the pre-coded data;
wherein the correction factor calculator is also configured to:
calculate, for the obtained downlink channel, a channel mean by using Resource Blocks (RBs) or RB Groups (RBGs);
carry out an eigenvalue decomposition operation for the channel mean of a scheduled RB according to a following formula: $\overline{H_n}\overline{H_n}^H = U_n \Sigma_n U_n^H$, where n represents a sequence number of an RB or an RBG, $\overline{H_n}$ represents a channel mean, $U_n$ represents a unitary matrix, $U_n^H$ represents a transposed matrix of $U_n$, and $\Sigma_n$ represents a diagonal matrix composed of characteristic values of $\overline{H_n}$; and
calculate, based on a result of the eigenvalue decomposition, a weight phase correction factor according to a following formula: $Q_n = e^{-j * angle(U_n(1,1))}$, where angle($U_n$) represents phase of $U_n$, and $Q_n$ represents a weight phase correction factor;
wherein the correction factor calculator calculates, for the obtained downlink channel, a channel mean by using RBs according to a following formula:

$$\overline{H_n} = \frac{1}{6} \sum_{k=k_0+1}^{k_0+6} H_k,$$

where n represents a sequence number of an RB, $k_0$ represents a sequence number of a starting subcarrier of the RB, k represents a sequence number of a subcarrier of the RB, $H_k$ represents a downlink channel, and $\overline{H_n}$ represents a channel mean; or
wherein the correction factor calculator calculates, for the obtained downlink channel, a channel mean by using RBGs according to a following formula:

$$\overline{H_n} = \frac{1}{6*N} \sum_{k=k_0+1}^{k_0+6*N} H_k,$$

where n represents a sequence number of an RBG, $k_0$ represents a sequence (number of a starting subcarrier of the RBG, k represents a sequence number of a subcarrier of the RBG, N represents a number of the RBs in the RBG, $H_k$ represents a downlink channel, and $\overline{H_n}$ represents a channel mean.

8. The base station according to claim 7, wherein the correction factor calculator is also configured to correct the pre-coding weight with the weight phase correction factor according to a following formula:

$$W_n = (U_n Q_n)^H,$$

where $W_n$ represents a corrected pre-coding weight, $U_n$ represents a unitary matrix, $Q_n$ represents the weight phase correction factor, and $(U_n Q_n)^H$ represents a transposed matrix of $U_n Q_n$.

* * * * *